US012094229B2

(12) United States Patent
Lv et al.

(10) Patent No.: US 12,094,229 B2
(45) Date of Patent: Sep. 17, 2024

(54) CHARACTER RECOGNITION METHOD AND APPARATUS, COMPUTER DEVICE, AND STORAGE MEDIUM

(71) Applicant: Tencent Technology (Shenzhen) Company Limited, Shenzhen (CN)

(72) Inventors: Pengyuan Lv, Shenzhen (CN); Zhicheng Yang, Shenzhen (CN); Xinhang Leng, Shenzhen (CN); Ruiyu Li, Shenzhen (CN); Xiaoyong Shen, Shenzhen (CN); Yuwing Tai, Shenzhen (CN); Jiaya Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 576 days.

(21) Appl. No.: 17/476,327

(22) Filed: Sep. 15, 2021

(65) Prior Publication Data

US 2022/0004794 A1 Jan. 6, 2022

Related U.S. Application Data

(63) Continuation of application No. PCT/CN2020/087010, filed on Apr. 26, 2020.

(30) Foreign Application Priority Data

May 10, 2019 (CN) .......................... 201910387655.1

(51) Int. Cl.
*G06N 3/08* (2023.01)
*G06F 18/22* (2023.01)
(Continued)

(52) U.S. Cl.
CPC ............ *G06V 30/153* (2022.01); *G06F 18/22* (2023.01); *G06N 3/08* (2013.01); *G06V 10/443* (2022.01); *G06V 30/10* (2022.01)

(58) Field of Classification Search
CPC .... G06V 30/153; G06V 10/443; G06V 30/10; G06V 30/18057; G06V 30/413;
(Continued)

(56) References Cited

U.S. PATENT DOCUMENTS

2019/0130215 A1* 5/2019 Kaestle .................. G06V 20/52

FOREIGN PATENT DOCUMENTS

| CN | 101944174 A | 1/2011 |
| CN | 109389091 A | 2/2019 |

(Continued)

OTHER PUBLICATIONS

Tencent Technology, ISR, PCT/CN2020/087010, Jul. 22, 2020, 2 pgs.
(Continued)

*Primary Examiner* — Charlotte M Baker
(74) *Attorney, Agent, or Firm* — Morgan, Lewis & Bockius LLP

(57) ABSTRACT

A computer device extracts an image feature of an image that includes one or more characters to be recognized. The image feature includes a plurality of image feature vectors. The device uses an attention mechanism to compute and output attention weight values corresponding to the target number of characters, based on the image feature vectors, through parallel computing. Each of the attention weight values corresponds to one or more respective characters and represents an importance of the plurality of image feature vectors for the respective characters. The device obtains at least one character according to the plurality of image feature vectors and the target number of attention weight values. Therefore, in a character recognition process, with recognition based on the foregoing attention mechanism, a character in any shape can be effectively recognized by (Continued)

using a simple procedure, thereby avoiding a cyclic operation process and greatly improving operation efficiency.

20 Claims, 8 Drawing Sheets

(51) Int. Cl.
*G06V 10/44* (2022.01)
*G06V 30/148* (2022.01)
*G06V 30/10* (2022.01)

(58) Field of Classification Search
CPC ......... G06F 18/22; G06F 18/253; G06N 3/08; G06N 3/045
USPC ........................................................ 382/181
See application file for complete search history.

(56) References Cited

FOREIGN PATENT DOCUMENTS

| | | |
|---|---|---|
| CN | 109492679 A | 3/2019 |
| CN | 110097019 A | 8/2019 |

OTHER PUBLICATIONS

Tencent Technology, WO, PCT/CN2020/087010, Jul. 22, 2020, 5 pgs.
Tencent Technology, IPRP, PCT/CN2020/087010, Nov. 16, 2021, 6 pgs.

* cited by examiner

CHARACTER RECOGNITION METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2020/087010, entitled "CHARACTER RECOGNITION METHOD AND APPARATUS, COMPUTER DEVICE AND STORAGE MEDIUM" filed on Apr. 26, 2020, which claims priority to Chinese Patent Application No. 201910387655.1, filed with the State Intellectual Property Office of the People's Republic of China on May 10, 2019, and entitled "CHARACTER RECOGNITION METHOD AND APPARATUS, COMPUTER DEVICE, AND STORAGE MEDIUM", all of which are incorporated herein by reference in their entirety.

FIELD OF THE TECHNOLOGY

This application relates to the field of network technologies, and in particular, to a character recognition technology.

BACKGROUND OF THE DISCLOSURE

As users demands intelligent recognition technologies, character recognition is widely applied. Character recognition may be used in any scenario in which text information needs to be extracted from a picture, for example, document digitization, identification photo recognition, picture public opinion monitoring, and illegal picture filtering.

In actual applications, text to-be-recognized is often irregular text. Therefore, in a character recognition process, irregular text often needs to be converted into regular text for recognition.

SUMMARY

Embodiments of this application provide a character recognition method and apparatus, a computer device, and a computer-readable storage medium, to improve character recognition efficiency. The technical solutions are as follows:

According to an aspect, a character recognition method is provided, where the method includes:
  extracting an image feature of an image that incudes one or more characters to be recognized, the image feature including a plurality of image feature vectors;
  based on the plurality of image feature vectors, acquiring a target number (e.g., quantity) of attention weight values through parallel computing, each of the attention weight values corresponds to one or more respective characters and represents an importance of the plurality of image feature vectors for the one or more respective characters; and
  obtaining at least one character according to the plurality of image feature vectors and the target number (e.g., quantity) of attention weight values.

According to an aspect, a character recognition apparatus is provided, where the apparatus includes:
  a feature extraction unit, configured to extract an image feature of a to-be-recognized image (e.g., an image that includes one or more characters to be recognized), the image feature including a plurality of image feature vectors;
  a parallel processing unit, configured to acquire a target quantity of attention weight values through parallel computing based on the plurality of image feature vectors, one attention weight value being used for representing importance of the plurality of image feature vectors for a character corresponding to the attention weight value; and
  a character acquiring unit, configured to obtain at least one character according to the plurality of image feature vectors and the target quantity of attention weight values.

In some implementations, the apparatus further includes:
  a dependency acquiring unit, configured to acquire a dependency feature vector of each image feature vector in the image feature, the dependency feature vector being used for representing image information and a dependency between the image feature vector and another image feature vector; and
  the parallel processing unit is specifically configured to acquire the target quantity of attention weight values through parallel computing based on dependency feature vectors of the plurality of image feature vectors.

In some implementations, the feature extraction unit is configured to: input the image into a convolutional neural network, perform feature extraction on the image by using each channel of a backbone network in the convolutional neural network, and output the image feature.

In some implementations, the dependency acquiring unit is configured to: input the plurality of image feature vectors into a relational attention module of a character recognition model, compute a similarity between the image feature vector and another image feature vector in an attention mapping space by using conversion units at each layer of the relational attention module, to obtain weights respectively corresponding to the image feature vector and the another image feature vector, and perform computing based on the obtained weights to output the dependency feature vector of the image feature vector.

In some implementations, the feature extraction unit is configured to: splice the image feature vectors in the image feature to obtain a feature sequence; determine corresponding location vectors for the image feature vectors based on locations of the image feature vectors in the feature sequence; and obtain, according to the image feature vectors and the corresponding location vectors, the plurality of image feature vectors that are processed by using the location vectors.

In some implementations, the parallel processing unit is configured to: input the dependency feature vectors of the plurality of image feature vectors into a parallel attention module, and perform parallel computing on the inputted feature vectors by using a target quantity of output nodes in the parallel attention module, to output the target quantity of attention weight values.

In some implementations, the character obtaining unit includes:
  a feature determining subunit, configured to obtain at least one attention feature according to the plurality of image feature vectors and the target quantity of attention weight values; and
  a decoding subunit, configured to decode the at least one attention feature to obtain the at least one character.

In some implementations, the decoding subunit is configured to: input the at least one attention feature into a decoding module of a character recognition model, acquire a dependency feature vector corresponding to each attention feature by using the decoding module, decode the dependency feature vector corresponding to the attention feature, and output a character with a largest probability in characters obtained through the decoding as a character corresponding to the attention feature.

In an aspect, a computer device is provided, including one or more processors and memory, the memory storing at least one instruction, the instruction being loaded and executed by the one or more processors to implement any of the methods disclosed herein.

In an aspect, a non-transitory computer-readable storage medium is provided, storing at least one instruction, the instruction being loaded and executed by a processor to implement operations performed any of the methods disclosed herein.

In an aspect, a computer program product including instructions is provided, the computer program product, when run on a computer, causing the computer to implement the foregoing method.

The technical solutions provided in the embodiments of this application produce at least the following beneficial effects:

The technical solutions in the embodiments of this application may be used for extracting a target quantity of characters from a to-be-recognized image. In the solutions, an image feature of the to-be-recognized image is extracted, and the image feature includes a plurality of image feature vectors. An attention mechanism is used for computing and outputting attention weight values corresponding to the target quantity of characters through parallel computing according to the plurality of image feature vectors. One attention weight value may indicate importance of the plurality of image feature vectors for a character corresponding to the attention weight value. Therefore, in a character recognition process, with recognition based on the foregoing attention mechanism, a character in any shape can be effectively recognized by using a simple procedure, thereby avoiding a cyclic operation process and greatly improving operation efficiency.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes implementations of this application in detail with reference to the accompanying drawings.

Attention mechanism is a means of quickly selecting high-value information from a large amount of information by using limited attention resources. A visual attention mechanism is a brain signal processing mechanism unique to human vision. Human vision obtains, by quickly scanning a global image, a target area that needs to be focused on, which is commonly known as an attention focus, and then devotes more attention resources to this area to acquire more detailed information about a target that needs to be focused on, while suppressing other useless information. The attention mechanism is widely used in various types of deep learning tasks such as natural language processing, image recognition, and speech recognition, and is one of the core technologies in the deep learning technology that deserves attention and in-depth understanding.

In summary, the attention mechanism has two main aspects: one is to determine which part of an input needs to be paid attention to; and the other is to allocate the limited information processing resources to the important part. The attention mechanism in deep learning is essentially similar to the human selective visual attention mechanism, and the core objective is also to select more critical information for a current task from a wide range of information.

Figure 1:
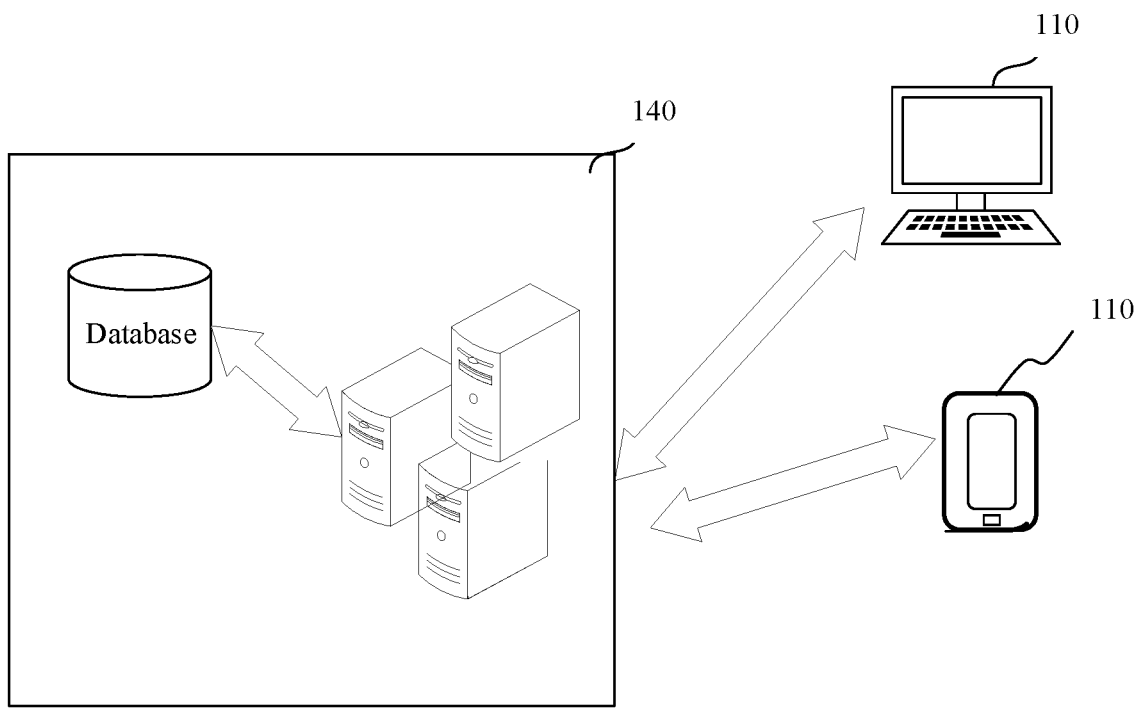
FIG. 1 is a structural block diagram of a character recognition system according to an exemplary embodiment of this application.

FIG. 1 is a structural block diagram of a character recognition system 100 according to an exemplary embodiment of this application. The character recognition system 100 includes a terminal 110 and a character recognition platform 140.

The terminal 110 is connected to the character recognition platform 140 by using a wireless network or a wired network. The terminal 110 may be at least one of a smartphone, a game console, a desktop computer, a tablet computer, an e-book reader, an MP3 player, an MP4 player, and a laptop portable computer. An application program that supports character recognition is installed and run on the terminal 110. The application program may be any one of a social application program, an instant messaging application program, a translation application program, a shopping application program, a browser program, or a video program. For example, the terminal 110 is a terminal used by a first user, and an application program running on the terminal 110 logs in to a first user account.

The terminal 110 is connected to the character recognition platform 140 by using a wireless network or a wired network.

The character recognition platform 140 includes at least one of a server system, a plurality of server systems, a cloud computing platform, and a virtualization center. The character recognition platform 140 is configured to provide a background service for the application program that supports character recognition. In some embodiments, the character recognition platform 140 undertakes primary recognition work, and the terminal 110 undertakes secondary recognition work. Alternatively, the character recognition platform 140 undertakes secondary recognition work, and the terminal 110 undertakes primary recognition work. Alternatively, the character recognition platform 140 or the terminal 110 may separately undertake recognition work.

In some embodiments, the character recognition platform 140 includes an access server, a character recognition server, and a database. The access server is configured to provide an access service for the terminal 110. The character recognition server is configured to provide a background service related to character recognition. There may be one or more character recognition servers. When there are a plurality of character recognition servers, at least two character recognition servers are configured to provide different services, and/or at least two character recognition servers are configured to provide the same service, for example, provide the same service in a load balancing manner. This is not limited in this embodiment of this application. A character recognition model may be set in the character recognition server. In this embodiment of this application, the character recognition model is a recognition model constructed based on an attention mechanism.

The terminal 110 may generally refer to one of a plurality of terminals. In this embodiment, the terminal 110 is merely used as an example for description. Types of the terminal 110 include at least one of a smartphone, a game console, a desktop computer, a tablet computer, an e-book reader, an MP3 player, an MP4 player, and a laptop portable computer.

A person skilled in the art may learn that there may be more or fewer terminals. For example, there may be only one terminal, or there may be dozens of or hundreds of or more terminals. In this case, the character recognition system further includes another terminal. The quantity and the device type of the terminals are not limited in the embodiments of this application.

Figure 2A:
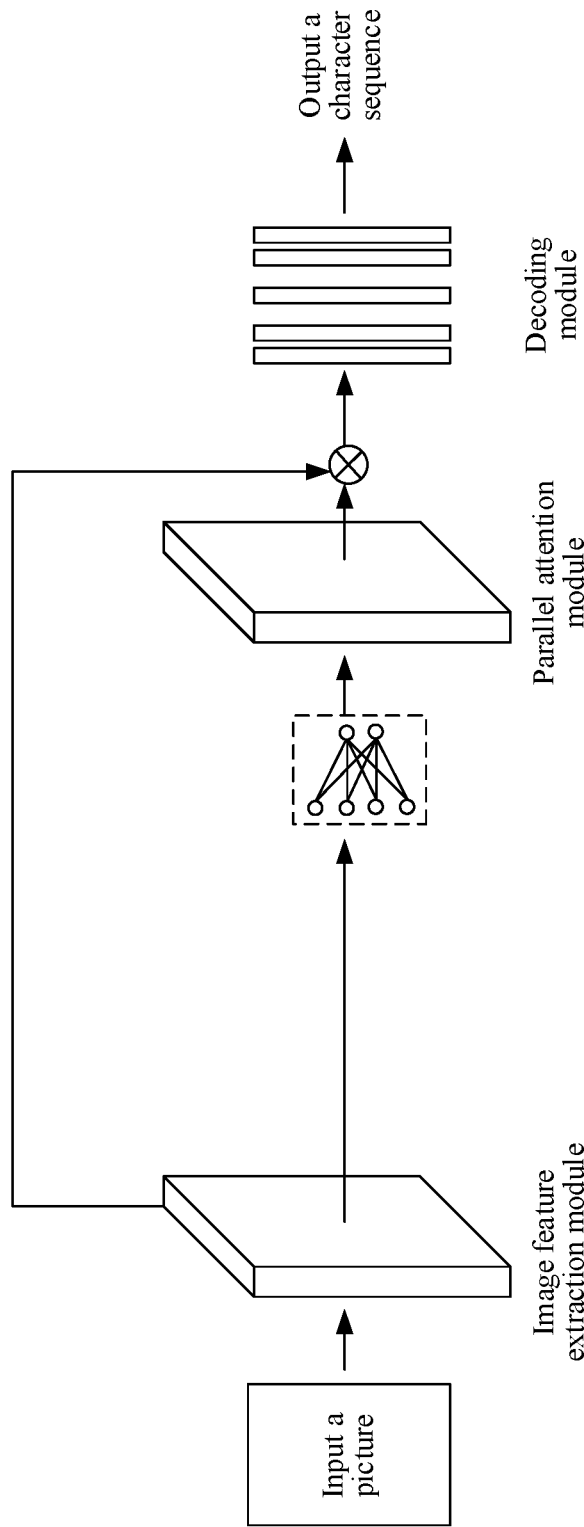
FIG. 2A is a brief flowchart of a character recognition process according to an embodiment of this application.

FIG. 2A is a brief flowchart of a character recognition process according to an embodiment of this application. Referring to FIG. 2A, a character recognition model includes a total of three modules: an image feature extraction module, a parallel attention module, and a decoding module.

Based on the foregoing modules, an image that includes one or more characters to be recognized is inputted into the character recognition model, h and w may be respectively used for representing a size of the inputted image, c is a quantity of channels of image features obtained through feature extraction, n is a quantity of output nodes of the parallel attention module, that is, a target quantity, and h, w, n, and c are all positive integers greater than 1. First, the image feature extraction module is used for extracting an image feature of the image, and then image feature vectors in the image feature are inputted into the parallel attention module to obtain n attention weight values (e.g., masks). Finally, an attention feature (e.g., glimpse) corresponding to each character is obtained by using the image feature vectors and the attention weight values, and the attention feature is decoded as a character by using the decoding module.

In this embodiment of this application, the attention mechanism is used for assigning different weights to a plurality of image feature vectors. For example, in the parallel attention module, a relatively large weight is assigned to an image feature vector of a relatively high degree of importance, and a relatively small weight is assigned to an image feature vector of a relatively low degree of importance, thereby reducing impact of an image feature vector of a relatively low degree of importance on decoding.

Figure 2B:
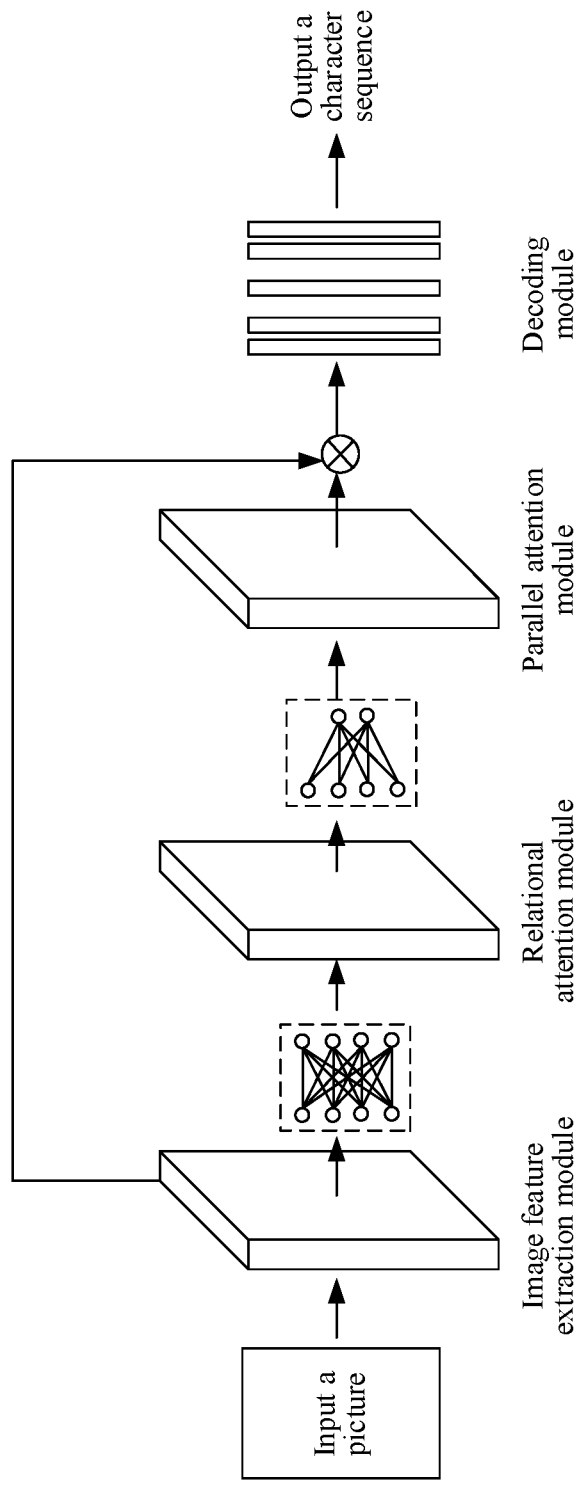
FIG. 2B is a brief flowchart of a character recognition process according to an embodiment of this application.

FIG. 2B is a brief flowchart of another character recognition process according to an embodiment of this application. Referring to FIG. 2B, compared with the character recognition model in FIG. 2A, the character recognition model includes a total of four modules: an image feature extraction module, a relational attention module, a parallel attention module, and a decoding module.

Compared with the foregoing manner of performing character recognition by using the character recognition model corresponding to FIG. 2A, in this solution, after an image feature of an image is extracted, image feature vectors in the image feature may be inputted into the relational attention module, so as to acquire an interdependency between the image feature vectors, where the dependency may be represented as a c-dimensional vector. Thereafter, an output of the relational attention module is inputted into the parallel attention module, so as to obtain n attention weight values, so that an attention feature corresponding to each character is obtained by using the image feature vectors and the attention weight values, and finally, the attention feature is decoded as a character by using the decoding module.

In this embodiment of this application, the attention mechanism is used for assigning different weights to a plurality of image feature vectors. For example, in the relational attention module, a relatively large weight is assigned to an image feature vector with a relatively large similarity to another feature in an attention mapping space, and a relatively small weight is assigned to an image feature vector with a relatively small similarity. In the parallel attention module, a relatively large weight is assigned to an image feature vector of a relatively high degree of importance, and a relatively small weight is assigned to an image feature vector of a relatively low degree of importance, thereby reducing impact of an image feature vector of a relatively low degree of importance on decoding.

Figure 3:
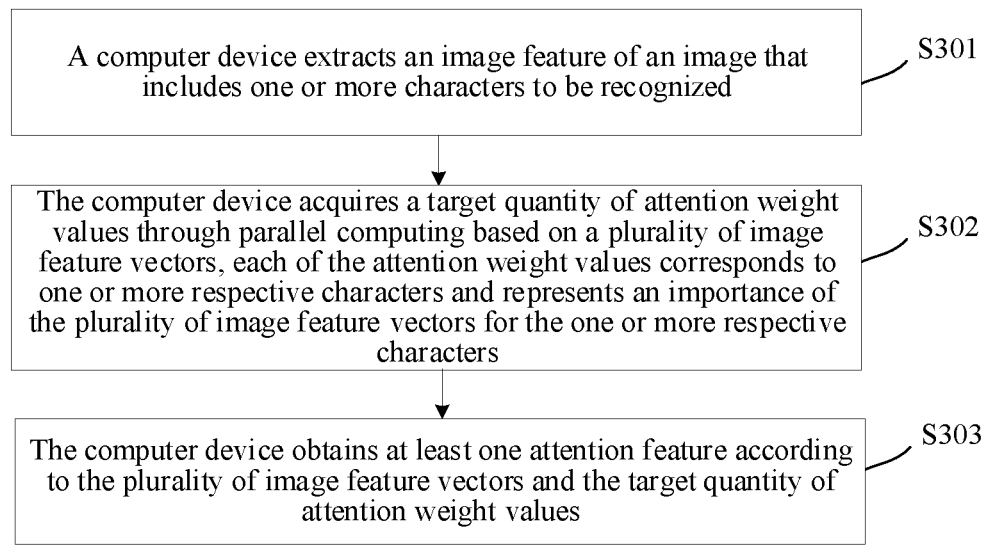
FIG. 3 is a flowchart of a character recognition method according to an embodiment of this application.

The following provides a specific implementation process of a character recognition method shown in FIG. 3 based on the foregoing model architecture and brief procedure shown in FIG. 2A. This embodiment of this application uses only an execution entity being a computer device as an example for description. The computer device may be implemented as a terminal or a server in an implementation environment. Referring to FIG. 3, the method includes the following steps.

301. The computer device extracts an image feature of a to-be-recognized image. The to-be-recognized image includes one or more characters to be recognized (e.g., determined).

The image feature includes a plurality of image feature vectors.

In this embodiment of this application, the computer device may input the to-be-recognized image into an image feature extraction module of a character recognition model, extract a feature of the image by using each channel of the image feature extraction module, and output an image feature that includes a plurality of image feature vectors.

A dimension of the image feature is not limited in this embodiment of this application, and the image feature may be a one-dimensional image feature, or may be a two-dimensional image feature. Dimensions of the two-dimensional image feature may be dimensions in two directions: image width and image height. Next, the technical solution provided in this embodiment of this application is described by using the two-dimensional image feature as an example.

To increase an image feature extraction speed, in some implementations, a process of extracting a plurality of two-dimensional image features of the to-be-recognized image may be implemented by using a backbone network of a convolutional neural network. For example, the backbone network may be a backbone network based on a residual structure (ResNet). Certainly, the backbone network can include, but is not limited to, a ResNet. For example, in some embodiment, the backbone network may alternatively use another convolutional neural network, such as Inception-Resnet-V2, NasNet, and MobileNet, and is not limited herein.

In some implementations, the backbone network may be a remaining structure of the convolutional neural network except a classification module, and may include a plurality of convolutional layers, for example, the backbone network may be a convolutional neural network reserved for the last convolutional layer. An output of the backbone network may be a feature map of an image.

For example, based on the foregoing model structure shown in FIG. 2B, a two-dimensional image feature of an image may be extracted by using the image feature extraction module. To reserve enough space information, a total size of the two-dimensional image feature outputted by the image feature extraction module may be $$\frac{h}{4} \times \frac{w}{4} \times c.$$

Actually, the two-dimensional image feature includes $$\frac{h}{4} \times \frac{w}{4}$$

c-dimensional image feature vectors, and each image feature vector may be represented as $I_i$, where i is a positive integer less than or equal to k, and $$k = \frac{h}{4} \times \frac{w}{4}.$$

302. The computer device acquires a target quantity of attention weight values through parallel computing based on a plurality of image feature vectors. One attention weight value is used for indicating importance of the plurality of image feature vectors for a character corresponding to the attention weight value.

303. The computer device obtains at least one attention feature according to the plurality of image feature vectors and the target quantity of attention weight values.

The target quantity may be a character output quantity preset for the character recognition model. In an embodiment of this application, the target quantity may be set for the character recognition model, so that an image on which character recognition is performed by using the character recognition model outputs the target quantity of characters.

In an embodiment of this application, for a character obtained by recognizing an image, the character may correspond to an attention weight value, and the attention weight value is used for identifying importance of a plurality of image feature vectors for a character corresponding to the attention weight value. A character corresponding to an attention weight value may be obtained and outputted through computing according to a plurality of image feature vectors and the attention weight value. In some embodiments, the target number of attention weight values is two or more. Each of the attention weight values corresponds to one or more respective characters and represents being used for representing an importance of the plurality of image feature vectors for a the one or more respective characters.

It may be understood that a quantity of characters in some images may be less than the target quantity. Therefore, for characters included in an image, some values in attention weight values obtained through computing are relatively large, and for characters not included in an image, all values in attention weight values obtained through corresponding computing are relatively small, so that characters obtained through computing according to the attention weight values are close to 0, and outputted characters corresponding to the attention weight values are empty.

The following provides an example for description. It is assumed that a target number (e.g., quantity) is 2, a letter included in a to-be-recognized image is a, three image feature vectors are extracted from the image as m1, m2, and m3, and the three image feature vectors are corresponding to three areas in the image. The target quantity of (that is, two) attention weight values obtained through computing are x1 and x2 respectively.

It is assumed that x1 corresponds to the first character that is to be outputted by recognizing the image, and that importance for the three image feature vectors is respectively 0.8, 0, and 0 (which correspond to m1, m2, and m3) in x1. Therefore, based on the attention weight value x1 of the first character, the importance of the image feature vector m1 is relatively high, that is, the first character is more likely to be in an area corresponding to the image feature vector m1. Therefore, the first character is obtained as "a" according to the three image feature vectors and the attention weight value x1. In addition, the attention weight value x2 corresponds to the second character that is to be outputted by recognizing the image, and importance for the three image feature vectors is respectively 0, 0, and 0 (which correspond to m1, m2, and m3) in x2. Therefore, based on the attention weight value x2 of the second character, the importance for the three image feature vectors is not high, and it may be determined that the image does not include the second character. Therefore, an empty second character is obtained according to the three image feature vectors and the attention weight value x2.

In a specific implementation, the target quantity of attention weight values may be computed by using the foregoing parallel attention module. The parallel attention module includes a target quantity of output nodes, denoted as n, and n is an integer less than k. According to a plurality of inputted image feature vectors, output nodes may compute attention weight values in parallel. In step 302, the parallel attention module performs computing on the inputted image feature vectors by using the following formula, to output the target quantity of attention weight values:

$$\alpha = \text{softmax}(W_2 \tanh(W_1 O^T))$$

where α is used for indicating an attention weight value, tanh( ) is a hyperbolic tangent function, softmax( ) is a normalization function, $O^T$ is an input to an output node, that is, an image feature vector, and $W_1$ and $W_2$ are parameters obtained through learning.

Step 302 is a process of acquiring the target quantity of attention weight values based on dependency feature vectors of the plurality of image feature vectors. In this process, the parallel attention module is used for performing a specific computing process. The parallel attention module is different from a conventional attention module, and does not determine an attention weight value of a current moment based on a value of a previous moment, but removes a correlation between output nodes. For each node, computing is independent, and parallel computing is implemented.

Therefore, the computer device can obtain the at least one attention feature according to the plurality of image feature vectors and the target quantity (e.g., number) of attention weight values according to the decoding module in the character recognition model in FIG. 2A or FIG. 2B.

The technical solutions in the embodiments of this application may be used for extracting a target quantity of characters from a to-be-recognized image. In this solution, an image feature of the to-be-recognized image is extracted, and the image feature includes a plurality of image feature vectors. An attention mechanism is used for computing and outputting attention weight values corresponding to the target quantity of characters through parallel computing according to the plurality of image feature vectors. One attention weight value may indicate importance of the plurality of image feature vectors for a character corresponding to the attention weight value. Therefore, in a character recognition process, with recognition based on the foregoing attention mechanism, a character in any shape can be effectively recognized by using a simple procedure, thereby avoiding a cyclic operation process and greatly improving operation efficiency.

In addition, a two-dimensional image feature of an image is extracted, and the dependency between image feature vectors in the two-dimensional image feature is determined by using the attention mechanism. Importance of the feature is further determined through parallel computing of an attention weight value. Therefore, in a character recognition process, character recognition may be directly performed based on the two-dimensional image feature and importance of each feature vector in the two-dimensional image feature. Because space information of the feature is reserved in the foregoing processing process of the two-dimensional image feature, accuracy of character recognition can be greatly improved.

The following describes another character recognition method based on the foregoing model architecture and brief procedure shown in FIG. 2B. The method includes the following steps.

401. A computer device inputs a to-be-recognized image into an image feature extraction module of a character recognition model, extracts a feature of the image by using each channel of the image feature extraction module, and outputs an image feature that includes a plurality of image feature vectors.

For description of step 401, refer to step 301. Details are not described herein again.

402. The computer device inputs a plurality of image feature vectors in a two-dimensional image feature outputted by the image feature extraction module into a relational attention module of the character recognition model, and computes a similarity between the image feature vector and another image feature vector in an attention mapping space by using conversion units at each layer of the relational attention module, to obtain weights of all image feature vectors, and computes and outputs dependency feature vectors of the image feature vectors based on the obtained weights.

In some implementations, linear weighting may be performed based on the weight, and nonlinear processing is performed on a feature vector obtained after the linear weighting, to obtain the dependency feature vector of the image feature vector.

The relational attention module includes many conversion units, and is a multi-layer bidirectional structure. A quantity of conversion units at each layer is equal to a quantity of inputted image feature vectors.

Figure 4:
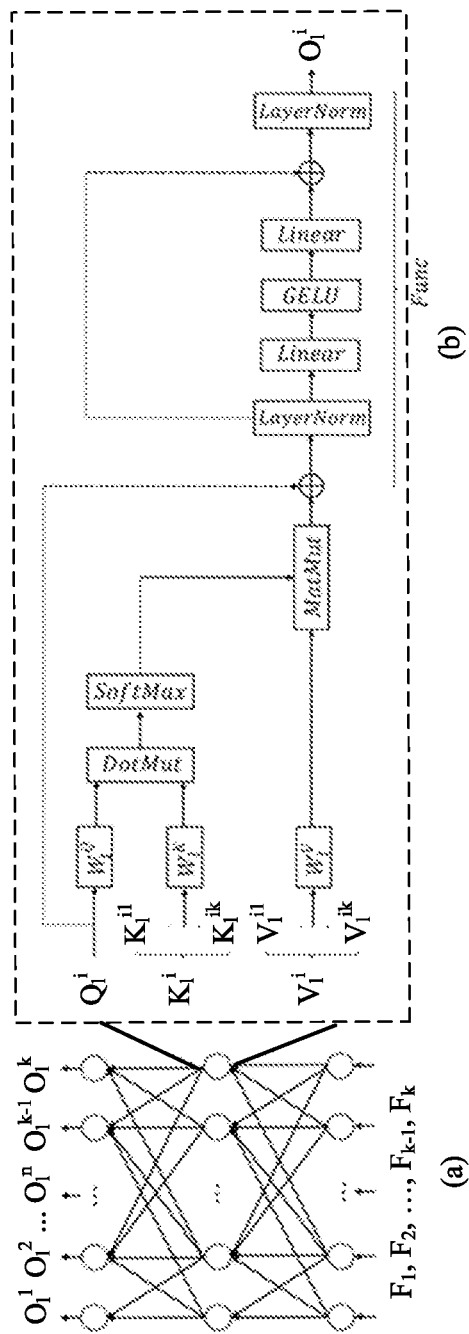
FIG. 4 is a schematic structural diagram of a relational attention module according to an embodiment of this application.

Referring to FIG. 4, (a) of FIG. 4 shows an internal structure of the relational attention module. The relational attention module includes a plurality of layers, and each layer includes conversion units whose quantity is the same as the quantity of inputted image feature vectors. (b) of FIG. 4 shows an internal structure of a conversion unit, where dotmat is used for indicating dot product computing, softmax is used for indicating normalization processing, matmut is used for indicating matrix multiplication, layernorm is used for indicating normalization processing in a channel direction, linear is used for indicating linear computing, and GELU is used for indicating activation function-based transformation processing. Each conversion unit includes three inputs: query, key, and value. That is, this may be understood as a dictionary query process. Key-value pairs form a dictionary. A user gives a query, and the computer device may find the same key as the query, and return a corresponding value. In the relational attention module, a similarity between the query and each inputted key may be respectively computed as a weight to be allocated to all values, and a weighted sum of the values is outputted as a value outputted at current time.

The inputs to the conversion units are respectively represented by using the following formulas (1), (2), and (3):

$$Q_l^i = \begin{cases} F_i & l = 1 \\ O_{l-1}^i & l > 1 \end{cases} \quad (1)$$

$$K_l^i = \begin{cases} F & l = 1 \\ O_{l-1} & l > 1 \end{cases} \quad (2)$$

$$V_l^i = \begin{cases} F & l = 1 \\ O_{l-1} & l > 1 \end{cases} \quad (3)$$

where l indicates a layer at which the conversion unit is located, i indicates a ranking of the conversion unit at the layer, $Q_l^i$ indicates a query for an $i^{th}$ conversion unit at an $l^{th}$ layer, and may be a vector of a size of 1×c, $K_l^i$ and $V_l^i$ respectively indicate a corresponding key and value, both sizes of which are $$\frac{h}{4} \times \frac{w}{4} \times c,$$

$O_{l-1}$ is outputs of all conversion units at an upper layer, and its shape and size is also $$\frac{h}{4} \times \frac{w}{4} \times c.$$

It may be learned from the foregoing formulas that, for a conversion unit at the first layer, its inputs come from a plurality of image feature vectors in a two-dimensional image feature outputted by the image feature extraction module. For a conversion unit not at the first layer, its inputs come from outputs of all conversion units at an upper layer.

An output of conversion units at each layer of the relational attention module is a weighted sum of inputs, and a weight value is represented by using the following formula (4):

$$\alpha_l^{ij} = \frac{\exp(W_l^q Q_l^i \cdot W_l^k K_l^{ij})}{\sum_{j'=1}^{k} \exp(W_l^q Q_l^i \cdot W_l^k K_l^{ij'})'} \quad (4)$$

where W is a parameter obtained through learning, $\alpha_l^{ij}$ indicates a weight of a $j^{th}$ key corresponding to an $i^{th}$ conversion unit at an $l^{th}$ layer, and a denominator of the formula is used for indicating a weighted sum of outputs of k conversion units.

The output of the conversion unit is represented by the following formula (5):

$$O_l^i = Func\left(\sum_{j=1}^{k} \alpha_l^{ij} W_l^v V_l^{ij}\right) \quad (5)$$

In formula (5), Func( ) is a nonlinear function. Based on the nonlinear function, nonlinear processing is performed on a linear function that has a limited representation capability, so as to improve the representation capability of the linear function. The nonlinear function may use any nonlinear function. This is not limited in this embodiment of this application.

An $i^{th}$ conversion unit at the first layer is used as an example to describe a working principle of the conversion unit. F is used as an input. For the $i^{th}$ conversion unit, its query is $F_i$, and its key and value are all $\{F_1, F_2 \ldots F_k\}$. A similarity between $F_i$ and each image feature vector in $\{F_1, F_2 \ldots F_k\}$ in an attention mapping space is respectively computed, and then normalized by using softmax, to obtain a weight. A normalized weight and the value are linearly weighted, and nonlinear processing of a structure in (b) is performed on a linearly weighted weight value to output $O_i$ as an input to an $i^{th}$ conversion unit at a next layer.

The dependency is determined directly based on the image feature vectors, which may avoid a problem that space information is lost when a feature is converted from two-dimensional to one-dimensional, and a computing amount of the foregoing process is relatively small, thereby correspondingly improving operation efficiency in the character recognition process.

In some implementations, before the image feature vector is inputted into the relational attention module, location sensitivity of the image feature vector may be improved, that is, image feature vectors in the two-dimensional image feature are spliced to obtain a feature sequence. Corresponding location vectors for the image feature vectors are determined based on locations of the image feature vectors in the feature sequence; and the location vector may be a vector with the same dimension as the image feature vector. Then, a plurality of processed image feature vectors are obtained based on the image feature vectors and the corresponding location vectors, for example, by adding the image feature vector and the corresponding location vector. Because the location vector may represent the location of the feature vector, a value of the obtained image feature vector at the corresponding location changes significantly, so as to improve location sensitivity.

The foregoing process of processing the image feature vector may be understood as the following process: A total size of feature vectors outputted by all channels is $$\frac{h}{4} \times \frac{w}{4} \times c$$

that may be expanded into a c-dimensional feature sequence, which includes $$\frac{h}{4} \times \frac{w}{4}$$

c-dimensional feature vectors. Coding may be performed based on a location of each feature vector in the feature sequence. For example, for the first feature vector in the feature sequence, a location vector $E_i$ whose dimension is c in (1, 0, 0, . . . 0) may be obtained through coding, and then each feature vector $I_i$ and a corresponding location vector $E_i$ are added to obtain a location-sensitive image feature vector. Such a processed image feature vector may be represented by using $F_i$.

After the plurality of processed image feature vectors are obtained, the computer device may use the plurality of processed image feature vectors as inputs to the first layer of the relational attention module, to continue a process such as weighting computing and the like, so as to output a dependency feature vector of each image feature vector.

In this method, an attention weight value is computed according to a dependency feature vector corresponding to an image feature vector. Because the dependency feature vector represents image information corresponding to the image feature vector and the dependency between the image feature vector and another image feature vector, the dependency is considered in a process of computing the attention weight value, thereby improving accuracy of attention weight value computing and improving character recognition efficiency.

403. The computer device inputs, into a parallel attention module in the character recognition model, the dependency feature vectors of the plurality of image feature vectors outputted by the relational attention module, and performs parallel computing on the inputted feature vectors by using each output node in the parallel attention module, to output a target quantity of attention weight values.

All output nodes compute attention weight values of the inputted dependency feature vectors in parallel. In step 403, the parallel attention module performs computing on the inputted image feature vectors by using the following formula (6), to output the target quantity of attention weight values:

$$\alpha = \mathrm{softmax}(W_2 \tanh(W_1 O^T)) \quad (6)$$

An input $O^T$ to the output node may be an output of the relational attention module.

404. The computer device obtains at least one attention feature according to the plurality of image feature vectors and the target quantity of attention weight values.

$$G_i = \sum_{j=1}^{k} \alpha_{ij} I_j \quad (7)$$

where $G_i$ is an attention feature of an output of an $i^{th}$ output node. The attention feature may be a feature of an $i^{th}$ character of a to-be-recognized image that is obtained through decoding. The $\alpha$ may be understood as importance corresponding to the plurality of image feature vectors for the i$^{th}$ character, or may be understood as an attention degree for each local part of an inputted image at a current moment, or may be understood as a mask from an image processing perspective. An attention feature obtained by performing weighted summation on the attention weight values and the image feature vectors may be understood as a result of selective observation of the inputted image by a network.

Therefore, at least one character is obtained by decoding the at least one attention feature.

Decoding may be performed in the following manner of step 405.

405. The computer device inputs the at least one attention feature into a two-stage decoder in the character recognition model for decoding to output the at least one character.

The computer device may convert the attention feature into a character by decoding the at least one attention feature, so as to implement character recognition. In this embodiment of this application, to improve recognition accuracy, a two-stage decoder may be used for capturing interdependency between output nodes.

To capture interdependency between output nodes, in this embodiment of this application, a two-stage decoder is used for implementing a function of a decoding module. Specifically, the at least one attention feature is inputted into the two-stage decoder in the character recognition model, a dependency feature vector of each attention feature is acquired by using a relational attention module in the two-stage decoder, the dependency feature vector corresponding to the attention feature is decoded by using the decoder, and a character with a largest probability in characters obtained through the decoding is outputted as a character corresponding to the attention feature.

In some implementations, a probability of each character may be computed in the following manner:

$$P_i \text{softmax}(WG_i+b) \quad (8)$$

Certainly, the two-stage decoder may be obtained through training, where W is a weight value obtained through training, and b is an offset value obtained in a training process. At the time of initialization of training samples during training, for a character sequence whose character length is less than n, "-" may be used for filling the character sequence to obtain a sequence whose length is n, and for a sequence whose length is greater than n, the sequence is truncated into a sequence whose length is n. "-" is a special character and may be used for indicating an end of a character sequence.

Figure 5:
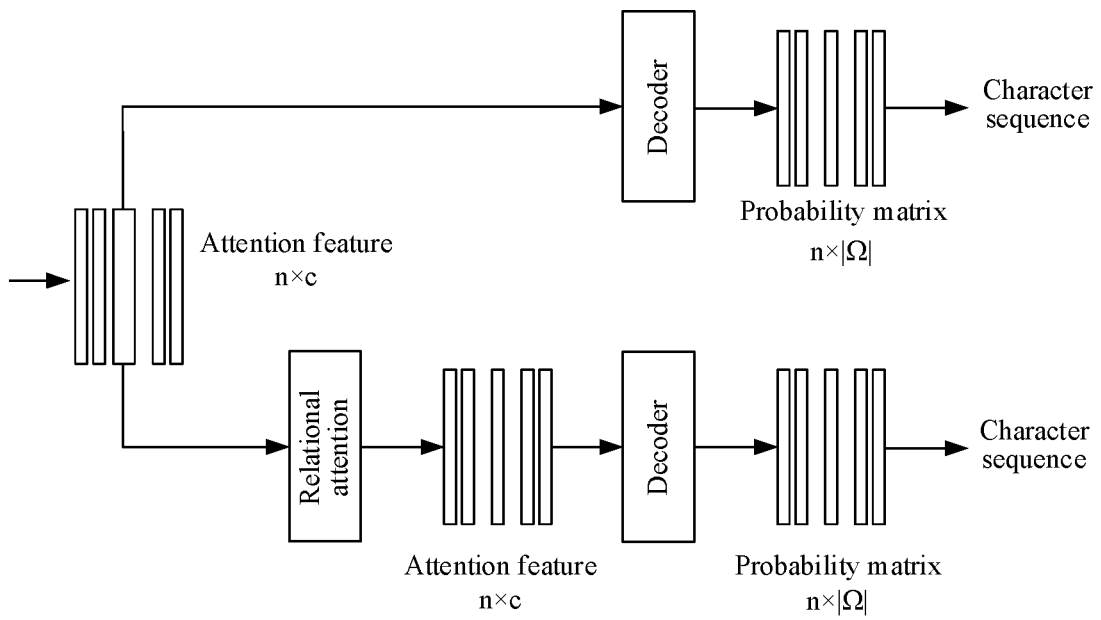
FIG. 5 is a schematic structural diagram of a two-stage decoder according to an embodiment of this application.

For a process of training the two-stage decoder, refer to a training architecture of the two-stage decoder shown in FIG. 5, where Ω is a character set. For an attention feature G whose size is n×c, decoding may be performed by using a decoder in a first branch, to obtain a probability matrix corresponding to the decoder in the first branch, and each element in the probability matrix is used for indicating a probability that the attention feature is any character in a character set. In addition, the attention feature G may be processed by a relational attention module in a second branch to obtain dependency between the attention feature and another attention feature, where the dependency may be represented by using a dependency feature vector whose size is n×c. Then, the dependency feature vector is processed by using a decoder in the second branch, so as to obtain a probability matrix corresponding to the decoder. For an attention feature, a character with the maximum probability in the probability matrix outputted by the first branch and the probability matrix outputted by the second branch is used as a character obtained by decoding the attention feature.

In some embodiments, the two decoders may be optimized at the same time during training. An optimization loss function is as follows:

$$L = \sum_{j=1}^{2} \sum_{j=1}^{n} (-\log P_{ij}(y_j)) \quad (9)$$

where y represents a true value of a character string corresponding to a training sample, and P is a probability of a character. By using the foregoing training process, a weight and an offset value can be obtained, so that in an application process, the second branch may be used as a decoding module of a character recognition model, and a character sequence obtained through decoding is finally outputted after decoding.

In the foregoing implementation, if computing efficiency is not considered, an attention feature may be alternatively obtained directly by using a serial computing manner based on image feature vectors. This is not specifically limited in this embodiment of this application. In addition, a network structure, an optimization method, and the like that the foregoing technical solution is applicable include but are not limited to the foregoing structure and loss function provided by using the figures and formulas.

According to the method provided in this embodiment of this application, a two-dimensional image feature of an image is extracted, and a dependency between image feature vectors in the two-dimensional image feature is determined by using the attention mechanism. An importance of the feature is further determined through parallel computing of an attention weight value. Therefore, in a character recognition process, character recognition may be directly performed based on the two-dimensional image feature and importance of each feature vector in the two-dimensional image feature. Because space information of the feature is reserved in the foregoing processing process of the two-dimensional image feature, accuracy of character recognition can be greatly improved. In addition, with recognition based on the foregoing attention mechanism, a character in any shape can be effectively recognized by using a simple procedure, thereby avoiding a cyclic operation process and greatly improving operation efficiency.

Figure 6A:
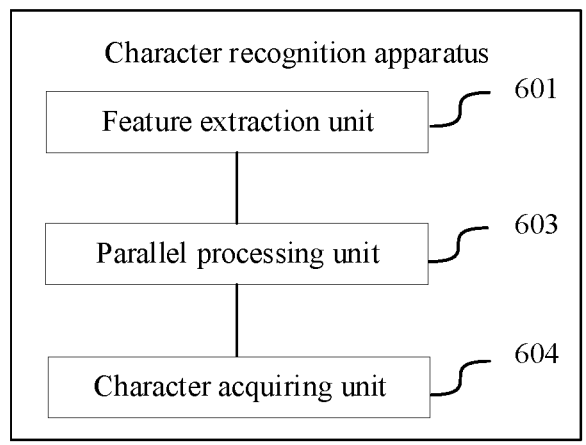
FIG. 6A is a schematic structural diagram of a character recognition apparatus according to an embodiment of this application.

FIG. 6A is a schematic structural diagram of a character recognition apparatus according to an embodiment of this application. Referring to FIG. 6A, the apparatus includes:

a feature extraction unit 601, configured to extract an image feature of a to-be-recognized image, the image feature including a plurality of image feature vectors;

a parallel processing unit 603, configured to acquire a target quantity of attention weight values through parallel computing based on the plurality of image feature vectors, one attention weight value being used for representing importance of the plurality of image feature vectors for a character corresponding to the attention weight value; and a character acquiring unit 604, configured to obtain at least one character according to the plurality of image feature vectors and the target quantity of attention weight values.

Figure 6B:
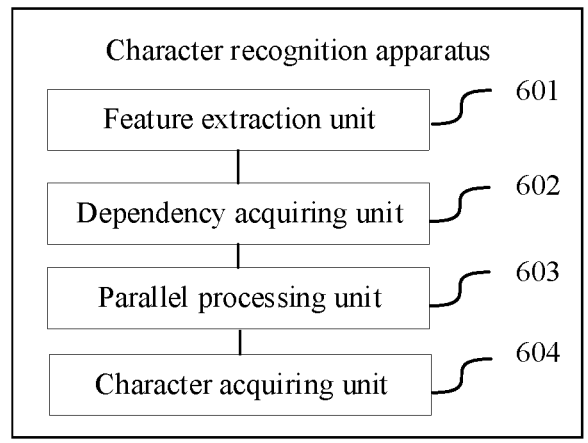
FIG. 6B is a schematic structural diagram of a character recognition apparatus according to an embodiment of this application.

In some implementations, referring to FIG. 6B, the figure shows a schematic structural diagram of a character recognition apparatus according to an embodiment of this application, and the apparatus further includes:

a dependency acquiring unit 602, configured to acquire a dependency feature vector of each image feature vector in the image feature, the dependency feature vector being used for representing image information and a dependency between the image feature vector and another image feature vector; and the parallel processing unit 604 is specifically configured to acquire the target quantity of attention weight values through parallel computing based on dependency feature vectors of the plurality of image feature vectors.

In some implementations, the feature extraction unit is configured to: input the image into a convolutional neural network, perform feature extraction on the image by using each channel of a backbone network in the convolutional neural network, and output the image feature.

In some implementations, the dependency acquiring unit is configured to: input the plurality of image feature vectors into a relational attention module of a character recognition model, compute a similarity between the image feature vector and another image feature vector in an attention mapping space by using conversion units at each layer of the relational attention module, to obtain weights respectively corresponding to the image feature vector and the another image feature vector, and perform computing based on the obtained weights to output a dependency feature vector of the image feature vector.

In some implementations, inputs $Q_l^i$, $K_l^i$, and $V_l^i$ to conversion units at each layer of the relational attention module are respectively represented by using the following formulas (1), (2), and (3):

$$Q_l^i = \begin{cases} F_i & l=1 \\ O_{l-1}^i & l>1 \end{cases} \quad (1)$$

$$K_l^i = \begin{cases} F & l=1 \\ O_{l-1} & l>1 \end{cases} \quad (2)$$

$$V_l^i = \begin{cases} F & l=1 \\ O_{l-1} & l>1 \end{cases} \quad (3)$$

where l indicates a layer at which a conversion unit is located, i indicates a ranking of the conversion unit at the layer, $Q_l^i$, $K_l^i$, and $V_l^i$ indicate inputs to an $i^{th}$ conversion unit at an $l^{th}$ layer, $F_i$ indicates an $i^{th}$ image feature vector, F is a set of the plurality of image feature vectors, and $O_{l-i}$ is outputs of all conversion units at an upper layer.

In some implementations, an output of conversion units at each layer of the relational attention module is a weighted sum of inputs, and a weight value is represented by using the following formula (4):

$$\alpha_l^{ij} = \frac{\exp(W_l^q Q_l^i \cdot W_l^k K_l^{ij})}{\sum_{j'=1}^{k} \exp(W_l^q Q_l^i \cdot W_l^k K_l^{ij'})'} \quad (4)$$

where W is a parameter obtained through learning, $\alpha_j^i$ indicates a weight of a $j^{th}$ key corresponding to an $i^{th}$ conversion unit at an $l^{th}$ layer, and a denominator of the formula is used for indicating a weighted sum of outputs of k conversion units.

The output of the conversion unit is represented by the following formula (5):

$$O_l^i = Func\left(\sum_{j=1}^{k} \alpha_l^{ij} W_l^v V_l^{ij}\right) \quad (5)$$

where Func( ) is a nonlinear function, and $O_l^i$ is an output of an $i^{th}$ conversion unit at an $l^{th}$ layer.

In some implementations, the feature extraction unit is configured to: splice the image feature vectors in the two-dimensional image feature to obtain a feature sequence; determine corresponding location vectors for the image feature vectors based on locations of the image feature vectors in the feature sequence; and obtain, according to the image feature vectors and the corresponding location vectors, the plurality of image feature vectors that are processed by using the location vectors.

In some implementations, the parallel processing unit 603 is configured to: input the dependency feature vectors of the plurality of image feature vectors into a parallel attention module, and perform parallel computing on the inputted feature vectors by using a target quantity of output nodes in the parallel attention module, to output the target quantity of attention weight values.

In some implementations, the parallel attention module computes an inputted feature by using the following formula, so as to output the target quantity of attention weight values:

$$\alpha = \text{softmax}(W_2 \tanh(W_1 O^T)) \quad (6)$$

where α is used for indicating an attention weight value, tanh( ) is a hyperbolic tangent function, softmax( ) is a normalization function, $O^T$ is an input to an output node, and $W_1$ and $W_2$ are parameters obtained through learning.

In some implementations, the character obtaining unit includes:

a feature determining subunit, configured to obtain at least one attention feature according to the plurality of image feature vectors and the target quantity of attention weight values; and a decoding subunit, configured to decode the at least one attention feature to obtain the at least one character.

In some implementations, the decoding subunit is configured to: input the at least one attention feature into a decoding module of a character recognition model, acquire a dependency feature vector of each attention feature by using the decoding module, decode the dependency feature vector corresponding to the attention feature, and output a character with a largest probability in characters obtained through the decoding as a character corresponding to the attention feature.

Figure 7:
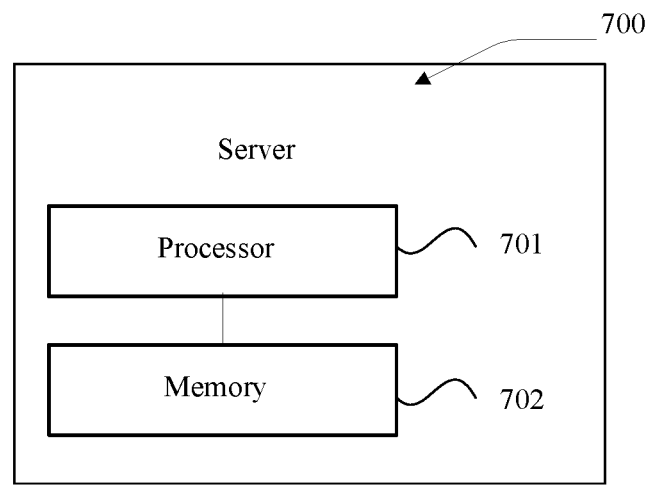
FIG. 7 is a schematic structural diagram of a terminal according to an embodiment of this application.

The method provided in this embodiment of this application may be implemented in a computer device, and the computer device may be implemented as a server. For example, FIG. 7 is a schematic structural diagram of a server according to an embodiment of this application. The server 700 may vary greatly due to different configurations or performance, and may include one or more central processing units (CPUs) 701 and one or more memories 702. The memory 702 stores at least one instruction, the at least one instruction being loaded and executed by the processor 701 to implement the character recognition method provided in the foregoing method embodiments. Certainly, the server may also have a wired or wireless network interface, a keyboard, an input/output (I/O) interface and other components to facilitate I/O. The server may also include other components for implementing device functions. Details are not described herein again.

Figure 8:
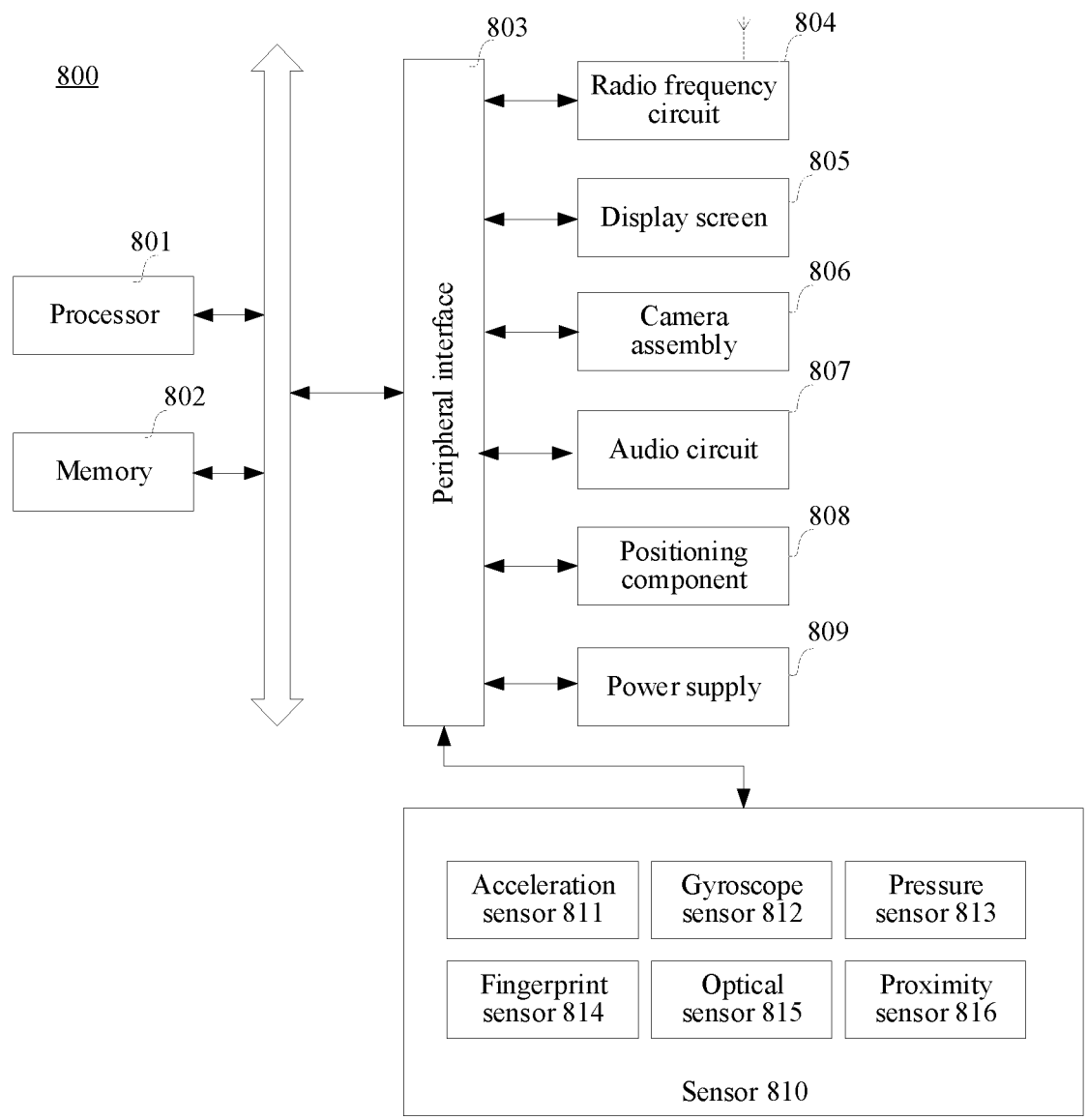
FIG. 8 is a schematic structural diagram of a server according to an embodiment of this application.

The method provided in this embodiment of this application may be implemented on a computer device. The computer device may be implemented as a terminal. For example, FIG. 8 is a schematic structural diagram of a terminal according to an embodiment of this application. The terminal 800 may be a portable mobile terminal such as a smartphone, a tablet computer, a Moving Picture Experts Group Audio Layer III (MP3), a Moving Picture Experts Group Audio Layer IV (MP4) player, a laptop computer, a desktop computer, a head-mounted device, or any another smart terminal. The terminal 800 may also be referred to as user equipment, a portable terminal, a laptop terminal, a desktop terminal, or the like.

Generally, the terminal 800 includes a processor 801 and a memory 802.

The processor 801 may include one or more processing cores, and may be, for example, a 4-core processor or an 8-core processor. The processor 801 may be implemented by using at least one hardware form of a digital signal processor (DSP), a field-programmable gate array (FPGA), and a programmable logic array (PLA). The processor 801 may also include a main processor and a coprocessor. The main processor is configured to process data in a wake-up state, which is also referred to as a CPU. The coprocessor is configured to process data in a standby state with low power consumption. In some embodiments, the processor 801 may be integrated with a graphics processing unit (GPU). The GPU is configured to render and draw content that needs to be displayed on a display screen. In some embodiments, the processor 801 may further include an artificial intelligence (AI) processor, which is configured to process a machine learning related computing operation.

The memory 802 may include one or more computer-readable storage media. The computer-readable storage medium may be non-transient. The memory 802 may further include a high-speed random access memory (RAM), and a non-volatile memory such as one or more magnetic disk storage devices or flash storage devices. In some embodiments, the non-transitory computer-readable storage medium in the memory 802 is configured to store at least one instruction, the at least one instruction being configured to be executed by the processor 801 to implement the character recognition method provided in the method embodiments of this application.

In some embodiments, the terminal 800 may include a peripheral interface 803 and at least one peripheral. The processor 801, the memory 802, and the peripheral interface 803 may be connected through a bus or a signal line. Each peripheral may be connected to the peripheral interface 803 through a bus, a signal line, or a circuit board. Specifically, the peripheral includes at least one of: a radio frequency (RF) circuit 804, a touch display screen 805, a camera assembly 806, an audio circuit 807, a positioning component 808, and a power supply 809.

The peripheral interface 803 may be configured to connect at least one peripheral related to I/O to the processor 801 and the memory 802. In some embodiments, the processor 801, the memory 802, and the peripheral interface 803 are integrated on the same chip or circuit board. In some other embodiments, any one or two of the processor 801, the memory 802, and the peripheral interface 803 may be implemented on a separate chip or circuit board, which is not limited in this embodiment.

The RF circuit 804 is configured to receive and transmit an RF signal, which is also referred to as an electromagnetic signal. The RF circuit 804 communicates with a communication network and other communication devices through the electromagnetic signal. The RF circuit 804 converts an electrical signal into an electromagnetic signal for transmission, or converts a received electromagnetic signal into an electrical signal. In some embodiments, the RF circuit 804 includes: an antenna system, an RF transceiver, one or more amplifiers, a tuner, an oscillator, a digital signal processor, a codec chip set, a subscriber identity module card, and the like. The RF circuit 804 may communicate with another terminal by using at least one wireless communication protocol. The wireless communication protocol includes, but is not limited to, a metropolitan area network, generations of mobile communication networks (2G, 3G, 4G, and 5G), a wireless local area network, and/or a wireless fidelity (Wi-Fi) network. In some embodiments, the RF circuit 804 may further include a circuit related to near-field communication (NFC), which is not limited in this application.

The display screen 805 is configured to display a user interface (UI). The UI may include a graph, text, an icon, a video, and any combination thereof. When the display screen 805 is a touch display screen, the display screen 805 is further capable of collecting touch signals on or above a surface of the display screen 805. The touch signal may be inputted, as a control signal, to the processor 801 for processing. In this case, the display screen 805 may be further configured to provide a virtual button and/or a virtual keyboard, which is also referred to as a soft button and/or a soft keyboard. In some embodiments, there may be one display screen 805 disposed on a front panel of the terminal 800. In some other embodiments, there may be at least two display screens 805 respectively disposed on different surfaces of the terminal 800 or designed in a foldable shape. In still some other embodiments, the display screen 805 may be a flexible display screen disposed on a curved surface or a folded surface of the terminal 800. Even, the display screen 805 may be further set to have a non-rectangular irregular shape, that is, a special-shaped screen. The display screen 805 may be made of materials such as a liquid crystal display (LCD), and an organic light-emitting diode (OLED).

A camera assembly 806 is configured to collect images or videos. In some embodiments, the camera assembly 806 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera assembly 806 may further include a flash. The flash may be a single color temperature flash or a double color temperature flash. The double color temperature flash is a combination of a warm light flash and a cold light flash, and may be used for light compensation under different color temperatures.

The audio circuit 807 may include a microphone and a speaker. The microphone is configured to acquire sound waves of a user and an environment, and convert the sound waves into electrical signals and input the electrical signals into the processor 801 for processing, or input the electrical signals into the RF circuit 804 to implement voice communication. For a purpose of stereo acquisition or noise reduction, there may be a plurality of microphones disposed at different portions of the terminal 800. The microphone may be further an array microphone or an omnidirectional microphone. The speaker is configured to convert electric signals from the processor 801 or the RF circuit 804 into sound waves. The speaker may be a conventional thin-film speaker or a piezoelectric ceramic speaker. When the speaker is the piezoelectric ceramic speaker, the speaker can not only convert an electrical signal into sound waves audible to a human being, but also convert an electrical signal into sound waves inaudible to the human being for ranging and other purposes. In some embodiments, the audio circuit 807 may also include an earphone jack.

The positioning component 808 is configured to position a current geographical position of the terminal 800 to implement navigation or a location-based service (LBS). The positioning component 808 may be a positioning component based on the Global Positioning System (GPS) of the United States, the BeiDou system of China, the GLONASS System of Russia, or the GALILEO System of the European Union.

The power supply 809 is configured to supply power to assemblies in the terminal 800. The power supply 809 may be an alternating-current power supply, a direct-current power supply, a disposable battery, or a rechargeable battery. In some embodiments, when the power supply 809 includes the rechargeable battery, the rechargeable battery may support wired charging or wireless charging. The rechargeable battery may be further configured to support a fast charge technology.

In some embodiments, the terminal 800 may also include one or more sensors 810. The one or more sensors 810 include, but are not limited to, an acceleration sensor 811, a gyroscope sensor 812, a pressure sensor 813, a fingerprint sensor 814, an optical sensor 815, and a proximity sensor 816.

The acceleration sensor 811 may detect a magnitude of acceleration on three coordinate axes of a coordinate system established with the terminal 811. For example, the acceleration sensor 811 may be configured to detect components of gravity acceleration on the three coordinate axes. The processor 801 may control, according to a gravity acceleration signal collected by the acceleration sensor 811, the touch display screen 805 to display the user interface in a frame view or a portrait view. The acceleration sensor 811 may be further configured to collect motion data of a game or a user.

The gyroscope sensor 812 may detect a body direction and a rotation angle of the terminal 800, and the gyroscope sensor 812 may work with the acceleration sensor 811 to collect a 3D action performed by the user on the terminal 800. The processor 801 may implement the following functions according to the data collected by the gyroscope sensor 812: motion sensing (for example, changing the UI according to a tilt operation of the user), image stabilization during shooting, game control, and inertial navigation.

The pressure sensor 813 may be disposed at a side frame of the terminal 800 and/or a lower layer of the touch display screen 805. When the pressure sensor 813 is disposed at the side frame of the terminal 800, a holding signal of the user on the terminal 800 may be detected, and the processor 801 performs left/right hand recognition or a quick operation according to the holding signal collected by the pressure sensor 813. When the pressure sensor 813 is disposed at the lower layer of the touch display screen 805, the processor 801 controls an operable control on the UI interface according to a pressure operation performed by the user on the touch display screen 805. The operable control includes at least one of a button control, a scroll-bar control, an icon control, and a menu control.

The fingerprint sensor 814 is configured to collect a fingerprint of a user, and the processor 801 identifies the identity of the user according to the fingerprint collected by the fingerprint sensor 814, or the fingerprint sensor 814 identifies the identity of the user according to the collected fingerprint. When the identity of the user is identified as a trusted identity, the processor 801 authorizes the user to perform a related sensitive operation. The sensitive operation includes unlocking a screen, viewing encrypted information, downloading software, payment, changing settings, and the like. The fingerprint sensor 814 may be disposed on a front surface, a rear surface, or a side surface of the terminal 800. When the terminal 800 is provided with a physical button or a vendor logo, the fingerprint sensor 814 may be integrated with the physical button or the vendor logo.

The optical sensor 815 is configured to collect ambient light intensity. In an embodiment, the processor 801 may control display luminance of the touch display screen 805 according to the ambient light intensity collected by the optical sensor 815. Specifically, when the ambient light intensity is relatively high, the display brightness of the touch display screen 805 is increased. When the ambient light intensity is relatively low, the display brightness of the touch display screen 805 is reduced. In another embodiment, the processor 801 may further dynamically adjust a camera parameter of the camera assembly 806 according to the ambient light intensity acquired by the optical sensor 815.

The proximity sensor 816, also referred to as a distance sensor, is usually disposed on a front panel of the terminal 800. The proximity sensor 816 is configured to collect a distance between a user and the front surface of the terminal 800. In an embodiment, when the proximity sensor 816 detects that the distance between the user and the front surface of the terminal 800 is gradually decreased, the processor 801 controls the touch display screen 805 to switch from a screen-on state to a screen-off state. When the proximity sensor 816 detects that the distance between the user and the front surface of the terminal 800 is gradually increased, the processor 801 controls the touch display screen 805 to switch from the screen-off state to the screen-on state.

A person skilled in the art may understand that the structure shown in FIG. 8 does not constitute a limitation on the terminal 800 and that the terminal may include more or fewer assemblies than those shown in the figure, a combination of some assemblies, or different assembly arrangements.

In an exemplary embodiment, a computer-readable storage medium, for example, a memory including instructions, is further provided. The instructions may be executed by the processor in the terminal or the server to implement the character recognition method in the foregoing embodiments. For example, the computer-readable storage medium may be a read-only memory (ROM), a RAM, a compact disc ROM (CD-ROM), a magnetic tape, a floppy disk, an optical data storage device, or the like.

An embodiment of this application provides a computer program product including instructions, the instructions, when run on a computer, causing the computer to perform the foregoing method.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs feature extraction and/or character recognition. In practical application, the foregoing functions may be allocated to and completed by different functional modules according to requirements, that is, an inner structure of a device is divided into different functional modules to implement all or a part of the functions described above.

What is claimed is:

1. A character recognition method, comprising:
   extracting an image feature of an image that includes one or more characters to be recognized, the image feature including a plurality of image feature vectors;
   based on the plurality of image feature vectors, acquiring a target number of attention weight values through parallel computing, wherein each of the attention weight values corresponds to one or more respective characters and represents an importance of the plurality of image feature vectors for the one or more respective characters; and
   obtaining at least one character according to the plurality of image feature vectors and the target number of attention weight values.

2. The method according to claim 1, further comprising:
   acquiring a dependency feature vector of each image feature vector of the plurality of image feature vectors, the dependency feature vector being used for representing image information and a dependency between the image feature vector and another image feature vector; and
   acquiring the target number of attention weight values further comprises:
   acquiring the target number of attention weight values through parallel computing based on a plurality of dependency feature vectors corresponding to the plurality of image feature vectors.

3. The method according to claim 1, wherein extracting the image feature further comprises:
   inputting the image into a convolutional neural network that includes a backbone network having one or more channels;
   performing feature extraction on the image using each of the channels of the backbone network; and
   outputting the image feature.

4. The method according to claim 3, wherein the backbone network comprises a remaining structure of the convolutional neural network and excludes a classification module.

5. The method according to claim 2, wherein acquiring the dependency feature vector of each image feature vector further comprises:
   inputting the plurality of image feature vectors into a relational attention module of a character recognition model;
   computing a similarity between the image feature vector and another image feature vector in an attention mapping space by using conversion units at each layer of the relational attention module to obtain weights respectively corresponding to the image feature vector and the another image feature vector;
   performing computations based on the obtained weights; and
   outputting the dependency feature vector according to the computations.

6. The method according to claim 5, further comprising prior to outputting the dependency feature vector of the image feature vector:
   performing linear weighting based on the weights; and
   performing nonlinear processing on a feature vector obtained after the linear weighting to obtain the dependency feature vector.

7. The method according to claim 1, wherein the image feature is a two-dimensional image feature.

8. The method according to claim 7, further comprising prior to acquiring the dependency feature vector of each image feature vector of the plurality of image feature vectors:
   splicing the plurality of image feature vectors to obtain a feature sequence;
   determining corresponding location vectors for the plurality of image feature vectors based on locations of the image feature vectors in the feature sequence; and
   obtaining, according to the image feature vectors and the corresponding location vectors, the plurality of image feature vectors that are processed by using the location vectors.

9. The method according to claim 2, wherein acquiring the target number of attention weight values further comprises:
   inputting the dependency feature vectors corresponding to the plurality of image feature vectors into a parallel attention module; and
   performing parallel computing on the inputted feature vectors using a target quantity of output nodes in the parallel attention module, to output the target quantity of attention weight values.

10. The method according to claim 1, wherein obtaining at least one character further comprises:

obtaining at least one attention feature according to the plurality of image feature vectors and the target number of attention weight values; and decoding the at least one attention feature to obtain the at least one character.

11. The method according to claim 10, wherein decoding the at least one attention feature further comprises:

inputting the at least one attention feature into a decoding module of a character recognition model;

acquiring a dependency feature vector corresponding to each attention feature by using the decoding module;

decoding the dependency feature vector corresponding to the attention feature; and outputting a character with a largest probability in characters obtained through the decoding as a character corresponding to the attention feature.

12. A computer device, comprising:

one or more processors; and memory storing one or more programs, that, when executed by the one or more processors, cause the one or more processors to perform operations comprising:

extracting an image feature of an image that includes one or more characters to be recognized, the image feature including a plurality of image feature vectors;

based on the plurality of image feature vectors, acquiring a target number of attention weight values through parallel computing, wherein each of the attention weight values corresponds to one or more respective characters and represents an importance of the plurality of image feature vectors for the one or more respective characters; and obtaining at least one character according to the plurality of image feature vectors and the target number of attention weight values.

13. The computer device according to claim 12, the operations further comprising:

acquiring a dependency feature vector of each image feature vector of the plurality of image feature vectors, the dependency feature vector being used for representing image information and a dependency between the image feature vector and another image feature vector; and acquiring the target number of attention weight values further comprises:

acquiring the target number of attention weight values through parallel computing based on a plurality of dependency feature vectors corresponding to the plurality of image feature vectors.

14. The computer device according to claim 12, wherein extracting the image feature further comprises:

inputting the image into a convolutional neural network that includes a backbone network having one or more channels;

performing feature extraction on the image using each of the channels of the backbone network; and outputting the image feature.

15. The computer device according to claim 14, wherein the backbone network comprises a remaining structure of the convolutional neural network and excludes a classification module.

16. The computer device according to claim 13, wherein acquiring the dependency feature vector of each image feature vector further comprises:

inputting the plurality of image feature vectors into a relational attention module of a character recognition model;

computing a similarity between the image feature vector and another image feature vector in an attention mapping space by using conversion units at each layer of the relational attention module to obtain weights respectively corresponding to the image feature vector and the another image feature vector;

performing computations based on the obtained weights; and outputting the dependency feature vector according to the computations.

17. The computer device according to claim 16, the operations further comprising prior to outputting the dependency feature vector of the image feature vector:

performing linear weighting based on the weights; and performing nonlinear processing on a feature vector obtained after the linear weighting to obtain the dependency feature vector.

18. A non-transitory computer readable storage medium storing instructions that, when executed by one or more processors of a computer device, cause the one or more processors to perform operations comprising:

extracting an image feature of an image that includes one or more characters to be recognized, the image feature including a plurality of image feature vectors;

based on the plurality of image feature vectors, acquiring a target number of attention weight values through parallel computing, wherein each of the attention weight values corresponds to one or more respective characters and represents an importance of the plurality of image feature vectors for the one or more respective characters; and obtaining at least one character according to the plurality of image feature vectors and the target number of attention weight values.

19. The non-transitory computer readable storage medium according to claim 18, further comprising:

acquiring a dependency feature vector of each image feature vector of the plurality of image feature vectors, the dependency feature vector being used for representing image information and a dependency between the image feature vector and another image feature vector; and acquiring the target number of attention weight values further comprises:

acquiring the target number of attention weight values through parallel computing based on a plurality of dependency feature vectors corresponding to the plurality of image feature vectors.

20. The non-transitory computer readable storage medium according to claim 18, wherein extracting the image feature further comprises:

inputting the image into a convolutional neural network that includes a backbone network having one or more channels;

performing feature extraction on the image using each of the channels of the backbone network; and outputting the image feature.

* * * * *